United States Patent [19]
Zimmermann et al.

[11] Patent Number: 5,925,459
[45] Date of Patent: Jul. 20, 1999

[54] USE OF A STRIP OF ADHESIVE FILM

[75] Inventors: Dieter Zimmermann, Jork; Bernd Lühmann, Norserstedt, both of Germany

[73] Assignee: Beiersdorf AG, Hamburg, Germany

[21] Appl. No.: 08/886,307

[22] Filed: Jul. 1, 1997

[30] Foreign Application Priority Data

Jul. 6, 1996 [DE] Germany ............ 196 27 400.1

[51] Int. Cl.$^6$ ..................................................... C09J 7/02
[52] U.S. Cl. ........................ 428/354; 428/192; 428/194; 428/355 RA; 524/271; 524/274; 524/525
[58] Field of Search .................... 428/192, 194, 428/354, 355 RA; 524/271, 274, 525

[56] References Cited

U.S. PATENT DOCUMENTS

| | | |
|---|---|---|
| 5,340,629 | 8/1994 | Rodighiero . |
| 5,491,012 | 2/1996 | Lühmann et al. ................ 428/354 |
| 5,626,931 | 5/1997 | Lühmann ........................... 428/201 |
| 5,626,932 | 5/1997 | Lümann et al. . |

FOREIGN PATENT DOCUMENTS

| | | |
|---|---|---|
| 200020 | 4/1986 | European Pat. Off. . |
| 3331016 | 10/1984 | Germany . |
| 3537433 | 10/1986 | Germany .................. 428/355 |
| 4431914 | 3/1996 | Germany . |
| 98/03601 | 1/1998 | WIPO . |

OTHER PUBLICATIONS

Abstract of E. P. 200,020, Apr. 3, 1986.
Abstract of DE 3,331,016, Oct. 11, 1984.

*Primary Examiner*—Andrew E. C. Merriam
*Attorney, Agent, or Firm*—Sprung Kramer Schaefer & Briscoe

[57] ABSTRACT

Use of a transparent grip tab for a strip of adhesive film for a temporary bond based on thermoplastic rubber and tackifier resins, where the adhesive film is of high elasticity and low plasticity and where the adhesion is lower than the cohesion, the adhesion largely disappears when the film is extended, the ratio of peel force to tear load is at least 1:1.5, and where an adhesive bond produced therewith can be detached by pulling on the adhesive film in the direction of the bond plane.

9 Claims, No Drawings

USE OF A STRIP OF ADHESIVE FILM

The invention relates to the use of a strip of adhesive film for a temporary bond, the strip having a transparent grip tab.

Adhesive films for temporary bonds which are re-detachable by pulling in the direction of the bond plane are known and are obtainable commercially under the name "tesa Power-Strips". Adhesive bonds produced with such strips offer powerful hold and yet can be re-detached without trace and without damage to the substrate or to the adherends, as described in DE 33 31 016 C2. DE 42 33 872 C2 also describes such adhesive films together with a hook.

DE 42 22 849 C1, moreover, discloses products of this kind in which the adhesive film strip is provided at one end with a UV-impermeable cover, serving simultaneously as grip tab, whose purpose is to avoid damage caused by UV radiation in the course of normal use.

Nevertheless, the prior art products have considerable disadvantages in their use, in particular because of the fact that they are necessarily bonded in such a way that a visible grip tab automatically protrudes from the joints, which in many cases is a visual disruption and is unwanted. Even the variant of DE 42 22 849 C1 is unable to overcome this disadvantage.

Admittedly, there are products of similar type with a film backing, for instance those in accordance with WO 92/11332 and WO 92/11333, where the problem of the grip tab arises in another form owing to the fact, indeed, that in the case of such products it is possible for the film backing itself to act as a grip tab—refer for instance to WO 92/11333, p.11, lines 31–35. Despite this, these documents do not provide any teaching as to how the problem of a disrupting grip tab can be solved, especially when the intention is to employ adhesive compositions according to DE 33 31 016 C2.

The object of the invention was to provide a remedy to this and, in fact, to arrange for the use of adhesive film strips of the type of DE 33 31 016 C2 in such a way that the grip tab required is not disruptive, and yet at the same time there is no likelihood of tearing when the adhesive film is pulled subsequently.

The invention relates accordingly to the use of a transparent grip tab as defined more closely in the claims.

The materials employed can advantageously be those described, along with their processing, in DE 33 31 016 C2. The ratio of peel force to tear load of the adhesive film used in accordance with the invention is greater than 1:1.5, in particular 1:2 or more. The high elasticity (extensibility) coupled with high tear strength also correlates, as a general rule, with low plasticity.

Particularly suitable elastomers are those of high tear strength and high extensibility.

It is preferably possible to employ block copolymers with blocks consisting of poly(vinylaromatic compounds) and blocks consisting of poly(1,3-dienes) or, respectively, their hydrogenation products. The polyvinyl aromatic blocks give the materials their cohesive properties and therefore substantially control their tear strength. The polydiene blocks or the follow-on products obtained therefrom from hydrogenation give the materials their elastic properties. The polyvinylaromatic compound employed is principally polystyrene, while elastomer blocks used are preferably poly(butadiene) and poly(isoprene) and their hydrogenation products, poly(ethylene/butylene) and poly(ethylene/propylene).

Of primary suitability are triblock copolymers with polystyrene end blocks, abbreviated to S below, and an elastomer middle block, abbreviated to D below (SDS triblock copolymers). These can include SD diblock copolymers. Also suitable in principle are linear $(SD)_n$, radial and star-shaped $(SD)_nX$ multiblock copolymers, or else mixtures of two or more of the abovementioned block copolymers.

Tackifiers which can be employed are the customary adhesive resins, for example hydrocarbon resins, polyterpene resins and terpene-phenol resins, and also rosin and rosin derivatives. Formulation is in accordance with the general rules.

Further components which may be present in the dhesive compositions include:

Plasticizer oils.

Anti-ageing agents, for example in the form of antioxidants and UV stabilizers.

Fillers—both inorganic and organic fillers, and especially pigments, may be part of the formulation.

Crosslinkers.

Suitable pressure-sensitive adhesive compositions can be processed from solution, from dispersion or as hot-melt pressure-sensitive adhesives. Preference is given to processing from the melt, since it can be used to achieve high material application levels at high coating speeds.

Hot-melt pressure-sensitive adhesive coating units which are suitable are standard types with, for example, a slot die or rolling-rod die, or single-screw and twin-screw extruders fitted with an appropriate die.

The transparent grip tab consists in particular of an elastic polymer film or an elastic backing. These films and backings are, in particular, elastomers having a resilience of >50%, preferably >80%. During the operation of detaching the bonded products, extensions of on average from 100 to 450% occur. It is also possible for values of up to 1500% to occur. The extension which occurs is dependent essentially on the tensile extension behaviour of the type of elastomer employed, on the thickness of the backing and on the bonding strength achieved by the adhesive films.

In any case, for residue-free re-detachment from the substrate or from the joint it is necessary for the tear strength of the adhesive film to be higher than its detachment force (stripping force). The ratio of tear force to stripping force is preferably >1.5, particularly preferably greater than >2.50.

The tear strength of the adhesive films described here is determined in particular by the nature and thickness of the backing films used. For backings based on styrene block copolymers with a linear triblock structure and block polystyrene contents of from about 15 to 40% by weight, the minimum backing thickness for double-sided pressure-sensitive adhesive films is about 50μcm for adhesive forces of > about 5 N/cm (see Examples). Below this limit, the tear strength is normally too low for re-detachment without residue. For substrates with high adhesion relative to the adhesive films employed (high bond strengths) the minimum required thickness of backing increases accordingly.

Preferred elastomers are:

1. Styrene Block Copolymers.

Styrene-isoprene and styrene-butadiene block copolymers and their hydrogenation products, styrene-ethylene/butylene and styrene-ethylene/propylene block copolymers, are suitable. Block copolymers according to the invention can be linear SES (S denotes the polystyrene block, E the elastomer block) triblock copolymers or else radial and star-shaped $(SE)_nX$ block copolymers (X denotes the n-functional coupling component) where $n \geq 3$, and linear $(SE)_n$ block polymers.

Typical block polystyrene contents are in the range from about 8 to 50% by weight, preferably between about 15 and 45% by weight. The SE diblock content chosen is preferably <50%.

2. Natural Rubber
3. Polyisoprene
4. Polybutadiene
5. Polychoroprene Rubber
6. Butyl Rubber
7. Silicone Rubber
8. EPDM Rubber or Ethylene-propylene Copolymers
9. Polyurethanes (e.g. Walopur 2201/Wolff Walsrode, Platilon UO 1/Atochem, Desmopan/Bayer, Elastollan/Elastogran)
10. Vinyl Copolymers
10a. Ethylene-vinyl Acetate Copolymers (e.g. M & W: 524.060, Exxon, Exxtraflex Film)
10b. Vinyl Chloride Acrylate Copolymers
11. Polyether Esters (e.g. Arnitel/Akzo, Hytrel/Du Pont)
12. Polyether Amides and Ester Amides (e.g. Pebax/Atochem, Grilon/Ems-Chemie)
13. Polycarbonate-polyester Copolymers
14. Ethylene-acrylate Copolymers
15. ABS Copolymers The abovementioned elastomers can also be employed as a constituent in polymer blends.

Cross-linking of the abovementioned materials may be advantageous in order to establish the mechanical properties.

In order to improve the anchorage of the pressure sensitive adhesive compositions to the intermediate backing the latter can be subjected to physical and/or chemical pretreatment (priming). Examples of suitable pretreatment methods are corona, flame, plasma and fluorine pretreatment.

In the examples below the intention is to describe the invention on the basis of working examples without wishing to restrict it unnecessarily thereby. All parts are by weight.

EXAMPLE 1

51.5 parts of linear SIS triblock copolymer having a block polystyrene content of 29% by weight and a Shore A hardness of 60 (Vector 4211), 47.0 parts of partially hydrogenated aromatic C-9 hydrocarbon resin having a ring and ball softening point of 100° C., a MMAP value of 58° C. and a DACP value of 16° C. (Regalite S260), 1.0 part of phenolic antioxidant (Irganox 1010) and 0.5 part of light stabilizer (polymeric, sterically hindered amine)

are kneaded until homogenous in a sigma-blade mixer at +160° C. The hot-melt pressure-sensitive adhesive composition thus obtained is applied at 160° C. in a coat thickness of 410 μm, using a slot die, to an 80 μm thick release film made from monoaxially oriented polypropylene which has been siliconized on both sides.

thickness of adhesive composition 410 μm tear force*) 3.9 N/mm$^2$ elongation at break*) 1100% bond strength) about 7 N/cm shear stability*) >20,000 min

* Stretching speed: 300 mm/min, sample length: 100 mm
** Steel, peel angle: 90°, rate of peel: 300 mm/min, adhesive tape laminated onto 25 μm PETP film
*** Steel, bond area: 13×20 mm$^2$, temperature=RT, 20N shear load.

This adhesive composition is applied to both sides of a 200 μm thick film of Vector 4461 D (an elastic SBS film) (Exxon) as described in more detail in Example 3.

EXAMPLE 2

25.5 parts of linear SBS triblock copolymer having a block polystyrene content of 29% by weight and a Shore A hardness of 65 (Vector 4261), 26.0 parts of linear SIS triblock copolymer having a block polystyrene content of 29% by weight and a Shore hardness of 60 (Vector 4211), 47.0 parts of pentaerythritol ester of hydrogenated rosin having a ring and bull softening point of 101° C. and an acid number of 12 (Pentalyn H-E), 1.0 part of phenolic antioxidant (Irganox 1010) and 0.5 part of light stabilizer (polymeric, sterically hindered amine)

are processed as in Example 1 and applied in a coat thickness of 200 μm to the release film described in Example 1.

Thickness of adhesive composition 200 μm

Bond strength **) 12.0 N/cm

Shear stability*) >10,000 min For ) and ***) see under Example 1

This adhesive composition is applied to both sides of a 200 μm thick Cariflex TR 1101 film (Shell) as described in more detail in Example 3.

Good results are also obtained if Cariflex TR 1101 (Shell) is replaced by Stereon 841 A (Firestone), Kraton G 1657 X (Shell), Walopur 2201 (Wolff-Walsrode) or Vector 4111 D (Exxon).

EXAMPE 3

Products from Examples 1 and 2 in bale form, consisting of double-sided pressure-sensitive adhesive tape with a release paper cover on one side and with an elastic SBS film (0.2 mm thick), are processed to adhesive strips in a unit consisting of a plurality of laminating and de-laminating stations and a rotary punch with a cutter.

Two 8 cm wide double-sided pressure-sensitive adhesive tapes (0.3 mm thick on release paper) are laminate, in each case 1 cm from the edge, onto the 20 cm wide elastic intermediate film (0.2 mm thick).

The same operation is carried out on the other side.

The assembly is then subjected to the action of the rotary punch, and separated in the middle, and the product is finished.

We claim:

1. An adhesive film strip useful for forming a temporary adhesive bond, said adhesive film strip being composed of an adhesive film composition comprising thermoplastic rubber and tackifying resins, and comprising a transparent grip tab protruding from an end thereof, wherein said adhesive film strip is of high elasticity and low plasticity, exhibits an adhesion that is lower than its cohesion, which adhesion largely disappears when the adhesive film strip is extended, and exhibits a ratio of tear load to peel force of at least 1.5:1, and wherein an adhesive bond produced with said adhesive film strip can be detached by pulling on the grip tab in the direction of the plane of said adhesive bond.

2. An adhesive film strip according to claim 1, wherein the composition is formulated to be self-adhesive.

3. An adhesive film strip according to claim 1, wherein the composition comprises a heat-activated adhesive.

4. An adhesive film strip according to claim 1, wherein the composition comprises antioxidants, UV stabilizers, colorants, fillers and/or auxiliaries.

5. An adhesive film strip according to claim 1, which has a thickness of from 0.2 mm to 1.2 mm.

6. An adhesive film strip according to claim 1, which exhibits a ratio of tear load to peel force of from 1.5:1 to 5:1.

7. An adhesive film strip according to claim 1, wherein the transparent grip tab consists of an elastic polymer film which, except for a region where the transparent grip tab is intended to be gripped, is coated on both sides with the adhesive film composition.

8. An adhesive film strip according to claim 7, wherein the elastic polymer film extends throughout the entire adhesive film strip.

9. A method of forming a temporary bond on a substrate comprising forming an adhesive bond between an adhesive film strip according to any one of claims 1–8 and said substrate, and, when it is desired to break said adhesive bond, gripping the transparent grip tab of said adhesive film strip and pulling on said transparent grip tab in the direction of the plane of said adhesive bond.

* * * * *